April 6, 1971 R. B. SCHOOLAR ET AL 3,574,140

EPITAXIAL LEAD-CONTAINING PHOTOCONDUCTIVE MATERIALS

Filed Feb. 26, 1968 2 Sheets-Sheet 1

INVENTORS
Richard B. Schoolar
Harold R. Riedl
John L. Davis

BY J. O. Tresansky
ATTORNEY

United States Patent Office 3,574,140
Patented Apr. 6, 1971

3,574,140

EPITAXIAL LEAD-CONTAINING PHOTO-CONDUCTIVE MATERIALS

Richard B. Schoolar, Hyattsville, and Harold R. Riedl and John L. Davis, Adelphi, Md., assignors to the United States of America as represented by the Secretary of the Navy Filed Feb. 26, 1968, Ser. No. 708,163
Int. Cl. H01c; H01l *13/00;* G03g *5/02*
U.S. Cl. 252—501 8 Claims

ABSTRACT OF THE DISCLOSURE

A photo-conductive material is formed by taking an epitaxial film of a lead salt or tin lead salt alloy and heating the film in the presence of a gaseous doping agent. The resulting product exhibits photo-sensitive junctions formed along crystallographic defect lines.

BACKGROUND OF THE INVENTION

The invention relates generally to a photo-conductive crystal and its method of preparation and more specifically to a photo-conductive epitaxial film and its method of preparation.

Polycrystalline lead salt photoconductors, including PbS, PbTe, and PbSe, have been used for many years as highly sensitive infrared radiation detectors. Their mechanism of sensitivity is poorly understood, but it has been generally concluded that the sensitivity of these films is related to their polycrystalline structure. Photoconductivity broadly speaking, occurs as some of the electrons in a semiconductor material absorb sufficient radiant photon energy to enable them to change from a bound state to a free state thereby increasing the number of current carriers. Spectral response of a particular photoconductor material depends on the minimum photon energy required to free electrons in that material and varies in different types of photoconductive materials. Since photon energy is directly related to frequency (or wavelength) it follows that there is a fairly well defined wavelength below which the sensitivity falls off rapidly.

Single-crystal (monocrystalline) films of lead salts are also known in the prior art but heretofore no significant photoconductivity has been observed in them at 2.5 microns.

In addition, though experiments have produced epitaxial films of certain tin lead salt alloys such as PbSnTe and PbSnSe, these materials have not heretofore shown photo-conductive properties.

SUMMARY OF THE INVENTION

Accordingly an object of the present invention is to provide a method of making improved photo-conductive epitaxial films of lead salts.

A further object of the instant invention is to provide a method of making improved photo-conductive epitaxial films of tin lead salt alloys.

Another object of the invention is to provide improved photo-conductive epitaxial films of lead salts.

Still another object is to provide improved photo-conductive epitaxial films of tin lead salt alloys.

Briefly, in accordance with one embodiment of this invention, these and other objects are attained by a process for heating and sensitizing an epitaxial film whereby the film is made photo-conductive and by the product of the process.

DESCRIPTION OF THE PREFERRED EMBODIMENT

The starting material in the process may be any n-type or p-type epitaxial film of a lead salt or a tin lead salt alloy on a suitable substrate. Typical lead salts include PbS, PbTe, and PbSe. All of these materials share the common property of being cubic crystals. These starting materials or host films may be provided by any conventional means. For example, a vacuum deposition technique for the preparatiton of epitaxial films of PbS is described by Schoolar and Zemel in the Journal of Applied Physics, volume 35, No. 6, June 1964. Alternatively, chemical deposition techniques for growing single crystal films may be used. One such technique is described by Davis and Norr in the Journal of Applied Physics, volume 37, No. 4, March 1966. Substrate materials will ordinarily be alkali-halides, silicon, or germanium, however, any substrate on which an epitaxial film can be grown is acceptable.

The epitaxial film starting materials are not photoconductive, but must be treated by the process of the present invention in order to become photoconductive, that is, heating in the presence of a sensitizing gas. Heating and sensitizing may be accomplished in a sealed tube or in the open air, depending on the choice of gas to be used. Generally, any gas capable of making the n-type epitaxial film more p-type or a p-type epitaxial film more n-type may be used. The p-type sensitizing gas, or doping agent may be, for example, sulfur, selenium, tellerium, sodium, potassium, oxygen, air, or other gases and the n-type doping agent may be iodine, silver, copper, gold or other gases.

If a gas such as sulfur is to be used, the epitaxial film and a solid quantity of the material to be vaporized to provide the doping gas are placed in opposite ends of glass tube several feet along and the tube is then evacuated and sealed. The film end of the ampoule is heated, for example by placing it in an oven, to a temperature from about 150° C. to 400° C. for a period of from about 30 minutes to 100 hours. The opposite end of the tube is maintained at a lower temperature which determines the vapor pressure of the dopant material. The vapor pressure does not appear to be critical and may vary between an upper limit that would destroy the crystal and a lower limit at which no sensitization occurs or generally the range of 1 torr to $1 \times 10^{-5}$ torr.

Alternately, if air is to be the sensitizing agent, the epitaxial host film is heated, for example, by a hot plate at about 100 to 250° C. for about one to ten minutes.

Figure 1:
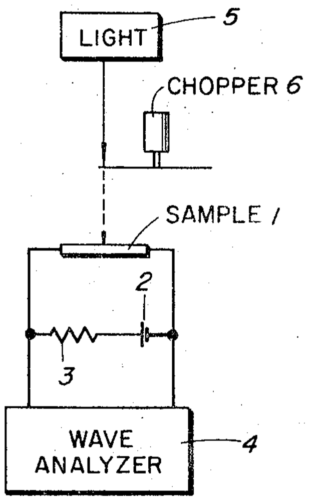
FIG. 1 is a block diagrammatic view of a set up to test the photo-conductive epitaxial film made by the process.

While the exact physical process is not completely understood, it appears that differential thermal expansion between the epitaxial film and substrate and possibly a temperature gradient across film occur causing microscopic crystallographic defects thereby exposing new crystal surfaces on which the p-doping or n-doping sensitizing gas acts to produce "npn-like" or "pnp-like" junctions which appear as parallel and perpendicular lines in the crystal as viewed from the plan view. FIG. 1 shows a test set-up wherein an epitaxial PbS film 1 (on a substrate which is not shown) sensitized by sulfur vapor by the aforementioned process, is connected in parallel to a DC battery 2 and resistor 3 and to a wave anlyzer 4.

A light source 5 and chopper 6 modulate a 150μ diameter light spot which is scanned over the film.

Figure 2:
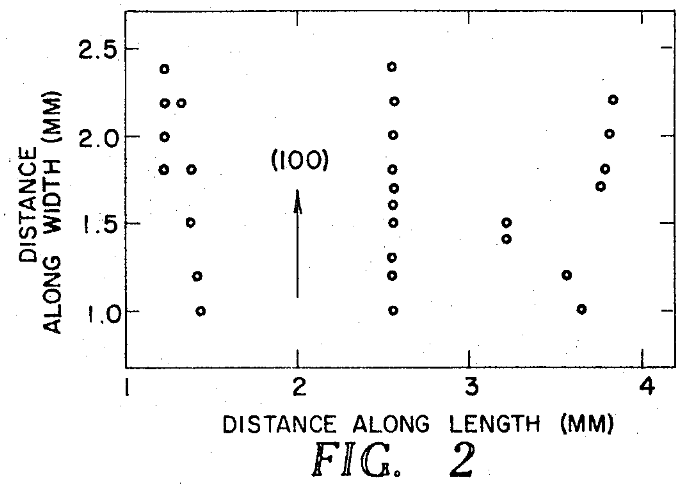
FIG. 2 is a plan view of the crystallographic defects in a photoconductive film made by the process.

FIG. 2 shows a plan view of the epitaxial PbS film showing the crystallographic defects detected on successive light spot scannings. The actual defects are in the form of lines, however.

Figure 3:
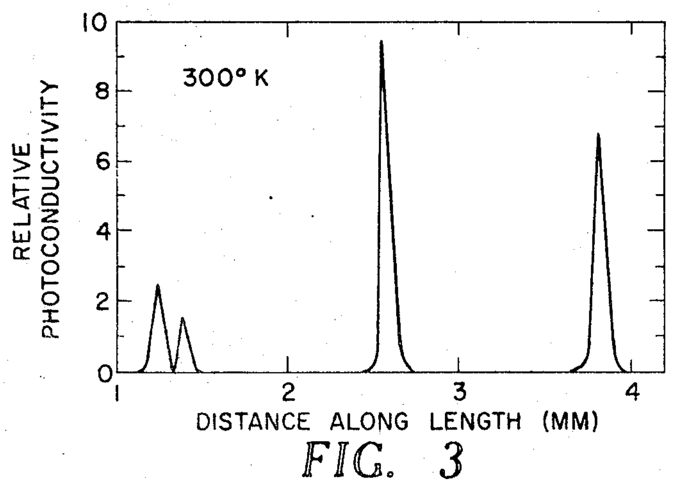
FIG. 3 is a graph of the relative photoconductivity of a photoconductive film made by the process.

FIG. 3 shows the wave analyzer output which is a function of the relative photoconductivity of the film at each point on the film along a single light spot scan.

Figure 4:
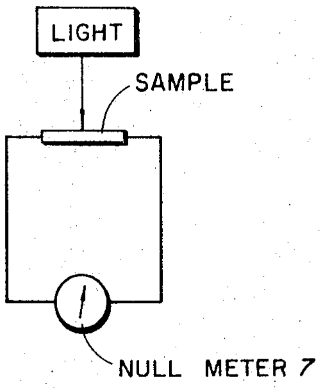
FIG. 4 is a block diagrammatical view of a second set up to test the film made by the process.

FIG. 4 illustrates a further test set up wherein the light spot was scanned along the same film and the photovoltage along its length was measured as by a null meter 7.

Figure 5:
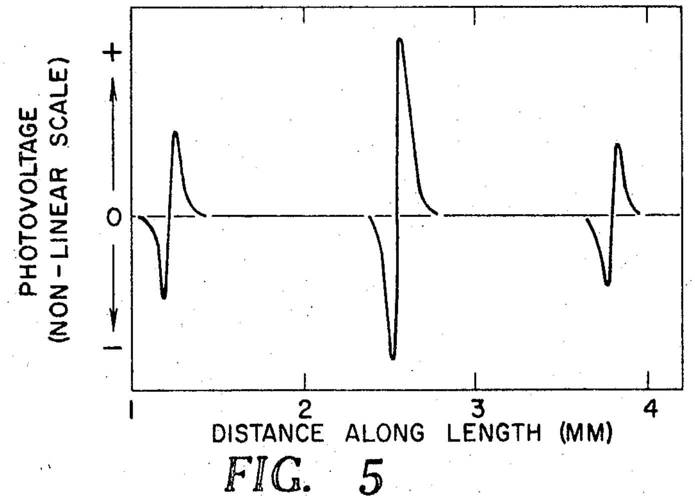
FIG. 5 is a graph of the relative photo-EMF along the length of the film made by the process.

FIG. 5 shows the photovoltage as measured by the apparatus of FIG. 4 for a single light spot scan. The photo-EMF across each defect line suggests that npn-like junctions are formed. The total EMF across the entire crystal is zero for a large number of defect lines.

Figure 6:
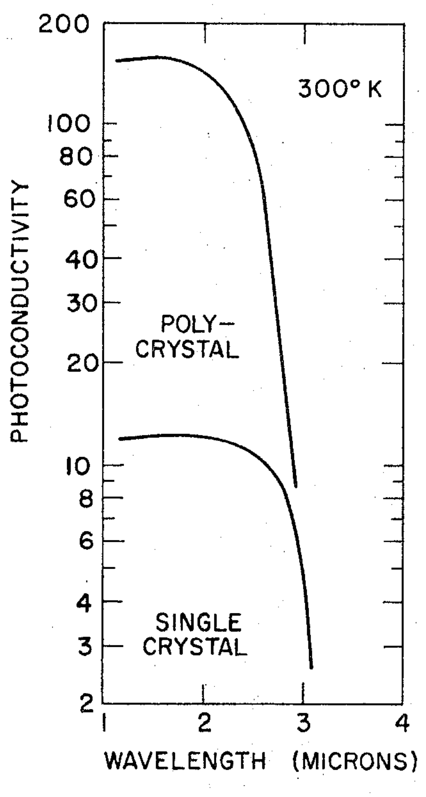
FIG. 6 is a graph showing the photo response of polycrystalline and single crystal photoconductors.

FIG. 6 shows the photo-response of a photosensitive PbS epitaxial film produced in comparison with the conventional polycrystalline PbS detector. It will be noted that both show the same type of response in the near-infrared range. While the single crystal is less sensitive, it appears that as the number of crystal defects increases the sensitivity approaches that of the polycrystal. However, it is to be understood that a relative vertical displacement between the two curves has been made for clarity.

The novel method and products of the present invention provide additional insight into the nature of the photoconductive phenomenon and moreover, the uniformity of parallel and perpendicular defects in the films may permit the use the films in light detection arrays, heretofore impossible with the random crystal structure of polycrystalline detectors.

Obviously, numerous modifications and variations of the present invention are possible in light of the above teachings. It is therefore to be understood that within the scope of the appended claims the invention may be practiced otherwise than as specifically described herein.

We claim:

1. A process of making a photoconductive material comprising heating an n-type epitaxial crystal selected from the group consisting of PbS, PbSe and PbTe in the presence of a p-type doping agent selected from the group consisting of sulfur, oxygen, selenium, tellurium, sodium, potassium and air wherein when said doping agent is selected from the group consisting of sulfur, oxygen, selenium, tellurium, sodium and potassium said n-type epitaxial crystal is heated between 150–400° C. for from 30 minutes to 100 hours and wherein said doping agent is air said n-type epitaxial crystal is heated between 100–250° C. for from 1 to 10 minutes.

2. A process according to claim 1 wherein when said n-type epitaxial crystal is heated in the presence of a p-type doping agent selected from the group consisting of sulfur, selenium, tellurium, sodium and potassium the pressure of the system is in the range of 1 torr to $1\times10^{-5}$ torr.

3. A process according to claim 1 wherein said p-type doping agent is air.

4. A process according to claim 2 wherein said p-type doping agent is sulfur.

5. The product of the process of claim 1.

6. A process of making a photoconductive material comprising heating a p-type epitaxial crystal selected from the group consisting of PbS, PbSe and PbTe in the presence of an n-type doping agent selected from the group consisting of iodine, silver, copper and gold at a temperature between 150–400° C. for from 30 minutes to 100 hours.

7. A process according to claim 6 wherein the pressure of the system is in the range of 1 torr to $1\times10^{-5}$ torr.

8. The product of the process of claim 6.

References Cited

Chem. Abs., vol. 63, col. 12425e, 1965.

DONALD LEVY, Primary Examiner

J. C. COOPER III, Assistant Examiner

U.S. Cl. X.R.

96—1.5